(12) United States Patent
Petermann et al.

(10) Patent No.: US 9,546,279 B2
(45) Date of Patent: Jan. 17, 2017

(54) ANTHRAQUINONE AZO DYES

(71) Applicant: Huntsman International LLC, The Woodlands, TX (US)

(72) Inventors: Ralf Petermann, Basel (CH); Urs Lauk, Magtstatt-le-Haut (FR); Kevin Murer, Basel (CH); Yvonne Pesek, Roschenz (CH)

(73) Assignee: HUNTSMAN INTERNATIONAL LLC, The Woodlands, TX (US)

( * ) Notice: Subject to any disclaimer, the term of this patent is extended or adjusted under 35 U.S.C. 154(b) by 0 days.

(21) Appl. No.: 14/400,571

(22) PCT Filed: May 15, 2013

(86) PCT No.: PCT/EP2013/059990
§ 371 (c)(1),
(2) Date: Nov. 12, 2014

(87) PCT Pub. No.: WO2013/182391
PCT Pub. Date: Dec. 12, 2013

(65) Prior Publication Data
US 2015/0096132 A1    Apr. 9, 2015

(30) Foreign Application Priority Data

Jun. 6, 2012 (EP) .................................... 12170978

(51) Int. Cl.
| | |
|---|---|
| *D06P 1/02* | (2006.01) |
| *D06P 1/04* | (2006.01) |
| *C09B 56/12* | (2006.01) |
| *D06P 3/52* | (2006.01) |
| *C09B 29/01* | (2006.01) |
| *C09B 67/22* | (2006.01) |

(52) U.S. Cl.
CPC ............ *C09B 56/12* (2013.01); *C09B 29/0022* (2013.01); *C09B 67/0046* (2013.01)

(58) Field of Classification Search
CPC .............. C09B 56/12; D06P 1/02; D06P 1/04; D06P 3/52
See application file for complete search history.

(56) References Cited

U.S. PATENT DOCUMENTS 4,042,578 A * 8/1977 Dehnert et al. ............... 534/766
4,709,019 A   11/1987 Rolf et al.
7,544,217 B2 * 6/2009 Clement et al. ................ 8/638

FOREIGN PATENT DOCUMENTS

| EP | 0 043 937 | 1/1982 |
|---|---|---|
| GB | 1 455 632 | 11/1976 |
| JP | 56-076458 | 6/1981 |
| WO | 2009/118260 | 1/2009 |

* cited by examiner

*Primary Examiner* — Amina Khan
(74) *Attorney, Agent, or Firm* — Huntsman International LLC

(57) ABSTRACT

Provided are anthraquinone azo dyes and dye mixtures which are distinguished by a very good build-up capacity and which also yield tinctorially strong dyeings or prints in a golden-yellow to orange shade having all around good properties, especially high temperature light fastness properties.

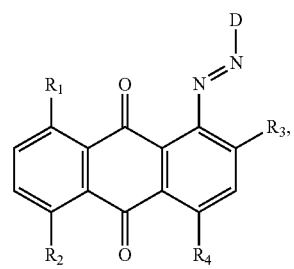

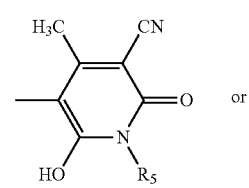

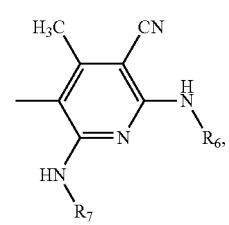

3 Claims, No Drawings

ANTHRAQUINONE AZO DYES

CROSS REFERENCE TO RELATED APPLICATIONS

This application is the National Phase of International Application PCT/EP2013/059990 filed May 15, 2013 which designated the U.S. and which claims priority to European Pat. App, No. 12170978.6 filed Jun. 6, 2012. The noted applications are incorporated herein by reference.

The present invention relates to anthraquinone azo dyes and to the use thereof in the dyeing or printing of semi-synthetic or synthetic hydrophobic fibre materials.

Anthraquinone-azo dyes based on 4-methyl-5-cyano-6-hydroxy-2-pyridones as coupling component which, by virtue of their properties of fastness to light and to migration, can be used in a variety of pigment applications, such as, for example, in paints and in the colouring of paper and plastics, are described in EP-A 43 937.

U.S. Pat. No. 7,005,507 discloses dyes prepared from substituted 3-cyano-4-methyl-pyridines and diazo components from the benzene, naphthalene, diphenyl, azobenzene, thiophene, benzothiazole, benzisothiazole, thiadiazole, indazole, benzotriazole, pyrazole, anthraquinone, naphtholic acid imide, chromone, phthalimide or diphenylene oxide series that yield tinctorially strong, alkali-stable dyeings or prints on polyester.

There is a need for new dyes or dye mixtures which are distinguished by a very good build-up capacity and yield tinctorially strong dyeings or prints in a golden-yellow to orange shades having good allround properties and, in particular, high temperature light fastness properties.

It has now been found, surprisingly, that the azo dyes according to the invention meet the criteria given above to a considerable degree.

The present invention accordingly relates to an azo dye of the formula

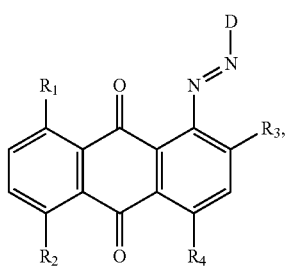

(1)

wherein $R_1$ is hydrogen or hydroxy,
$R_2$ is hydrogen or hydroxy, at least one of the radicals $R_1$ and $R_2$ being hydroxy,
$R_3$ is hydrogen, cyano, nitro or halogen,
$R_4$ is hydrogen, cyano, nitro or halogen,
D represents a radical of the formula

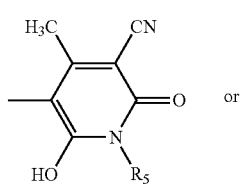

(2)

or

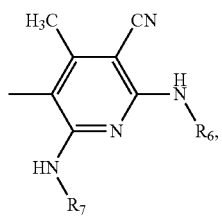

(3)

wherein $R_5$ denotes $C_1$-$C_{12}$alkyl, $C_1$-$C_{12}$hydroxyalkyl, $C_1$-$C_{12}$alkoxyalkyl, $C_2$-$C_{12}$alkenyl, $C_6$-$C_{30}$aryl or $C_7$-$C_{36}$aralkyl and $R_6$ and $R_7$, each independently of the other, is hydrogen, $C_1$-$C_{12}$alkyl, $C_1$-$C_{12}$hydroxyalkyl, $C_1$-$C_{12}$alkoxyalkyl, $C_6$-$C_{30}$aryl or $C_7$-$C_{36}$aralkyl, with the proviso that the compound of formula (1) is excluded, wherein $R_1$ is hydrogen, $R_2$ is hydroxy, $R_3$ and $R_4$ is hydrogen and D is the radical of formula (2) wherein $R_5$ is ethyl.

Any of the radicals $R_5$, $R_6$ and $R_7$ in formulae (2) and (3) that are alkyl may be straight-chain or branched radicals.

Examples are methyl, ethyl, n-propyl, isopropyl, n-butyl, isobutyl, sec-butyl, tert-butyl, n-pentyl, neopentyl, n-hexyl, 2-ethylhexyl, n-heptyl, n-octyl, n-nonyl, n-decyl and n-dodecyl.

Suitable $C_1$-$C_{12}$hydroxyalkyl groups as radicals $R_5$, $R_6$ or $R_7$ are, for example, 2-hydroxyethyl, 2-or 3-hydroxypropyl and 2-, 3-, or 4-hydroxybutyl.

Alkoxy radicals, too, may be straight-chain or branched. Examples of suitable alkoxy radicals are methoxy, ethoxy, n-propoxy, isopropoxy, tert-butoxy, n-pentyloxy, n-hexyloxy and n-decyloxy as well as 3-(2-methoxyethoxyl)propyl.

Alkenyl radicals as substituents $R_5$ preferably contain 2 to 6, in particular 2 or 3, carbon atoms. Examples are vinyl, allyl and crotyl.

Aryl radicals are, for example, phenyl, tolyl, mesityl, isityl, naphthyl and anthryl.

Suitable aralkyl groups are, for example, benzyl and 2-phenylethyl.

Suitable halogen atoms as radicals $R_3$ and $R_4$ is are fluorine, chlorine or bromine, preferably chlorine or bromine.

Further preference is given to azo dyes of the formula (1) as defined above, wherein D represents a radical of the formula (2), wherein $R_5$ denotes ethyl, n-propyl, n-butyl, n-hexyl, 2-methoxyethyl, 3-methoxypropyl or 2-phenylethyl.

Special preference is given to azo dyes of the formula (1), wherein D represents a radical of the formula (3), wherein $R_6$ and $R_7$, each independently of the other, is hydrogen, n-propyl, n-butyl, isobutyl, 2-methoxyethyl, 3-methoxypropyl, 3-(2-methoxyethoxyl)propyl, phenyl, 4-n-butylphenyl or 2-phenylethyl.

The dyes of formula (1) can be prepared according to known methods, for instance by diazotising an aminoanthraquinone of the formula

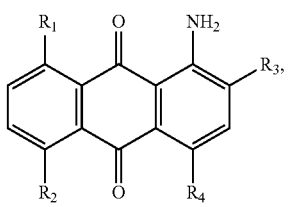

wherein $R_1$, $R_2$, $R_3$ and $R_4$ are as defined above for formula (1), in accordance with a customary procedure and subsequently coupling the resulting diazonium salt to a coupling component of the formula

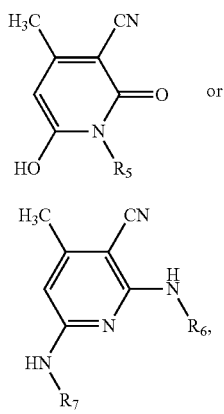

wherein $R_5$, $R_6$ and $R_7$ are as defined above for formulae (2) and (3).

The diazotisation of the compound of formula (5) is carried out in a manner known per se, for example with sodium nitrite in an acidic, e.g. hydrochloric-acid-containing or sulfuric-acid-containing, aqueous medium. The diazotisation may, however, also be carried out using other diazotisation agents, e.g. nitrosylsulfuric acid. During the diazotisation, an additional acid may be present in the reaction medium, e.g. phosphoric acid, sulfuric acid, acetic acid, propionic acid or hydrochloric acid or a mixture of such acids, e.g. a mixture of propionic acid and acetic acid. The diazotisation is advantageously carried out at temperatures of from −10 to 30° C., for example from −10° C. to room temperature.

The coupling of the diazotised compound of formula (5) to the coupling component of formula (6) or (7) is likewise effected in known manner, for example in an acidic, aqueous or aqueous-organic medium, advantageously at temperatures of from −10 to 30° C., especially below 10° C. Examples of acids used are hydrochloric acid, acetic acid, propionic acid, sulfuric acid and phosphoric acid.

The compounds of formula (5) are known or can be prepared in a manner known per se.

1-hydroxy-5-amino anthraquinone and 1-hydroxy-8-amino anthraquinone can be synthesized according to DE 148875, 5-amino quinizarine according to H. Waldmann, J. prakt. Chem 130 (1931), 92-102.

The coupling components of formulae (6) and (7) are also known or can be prepared in a manner known per se.

The coupling components of formula (7) are usually prepared according to U.S. Pat. No. 3,853,895 by reacting 2,6-dichloro-3-cyano-4-methylpyridine first with the compound $R_6$—$NH_2$ and then with $R_7$—$NH_2$, wherein $R_6$ and $R_7$ are as defined above. In case $R_6$ and $R_7$ are not identical, normally a mixture of two different isomers arises. From the resulting coupling component mixture, the individual coupling components can be obtained by subsequent chromatographic separation.

However, with regard to the use-oriented properties of the resulting dyestuffs it is not necessary to separate the isomeric coupling components, but they can be reacted as a mixture with the diazonium salt thus providing a mixture of dyestuffs which has no detrimental effect in comparison with the single components.

Accordingly, the isomeric coupling components resulting from the reaction of 2,6-dichloro-3-cyano-4-methylpyridine with $R_6$—$NH_2$ and $R_7$—$NH_2$, as well as the dye mixtures resulting therefrom are usually not separated.

The azo dyes according to the invention can advantageously be combined with other specific yellow anthraquinone azo dyes thus providing dye mixtures showing outstanding build-up characteristics and yield dyeings or prints in a desired golden-yellow shade having good fastness properties, in particular high temperature light fastness.

The invention therefore further relates to a dye mixture comprising (A) at least one dye of formula (1) as defined above, and (B) at least one dye of formula (4)

wherein $R_8$ denotes $C_1$-$C_{12}$alkyl, $C_1$-$C_{12}$hydroxyalkyl, $C_1$-$C_{12}$alkoxyalkyl, $C_2$-$C_{12}$alkenyl, $C_6$-$C_{30}$aryl or $C_7$-$C_{36}$aralkyl, the weight ratio of components A:B being from 1:4 to 4:1.

The dyes of formula (4) are described, for example, in EP-A 43 937.

Suitable dyes of formula (4) which can advantageously be used in the mixtures according to the invention are the compounds of formulae (401), (402) and (403).

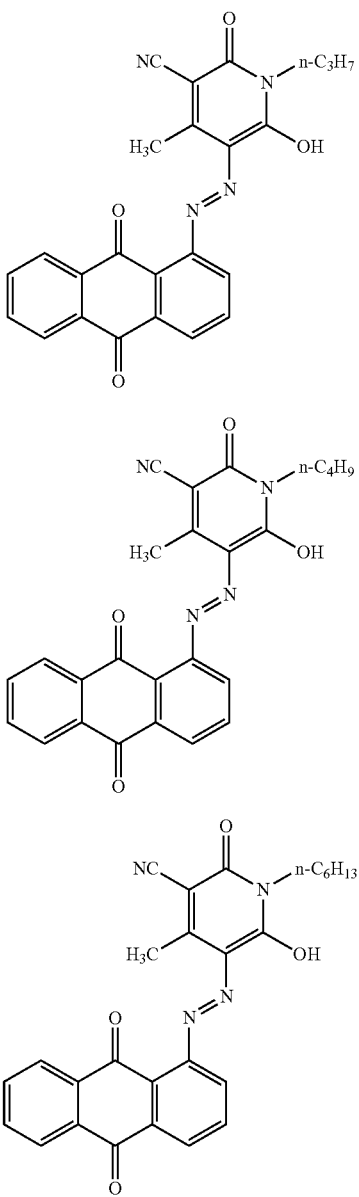

In a preferred embodiment a mixture containing 20-40% by weight of a compound of formula (401), 20-40% by weight of a compound of formula (402) and 20-40% by weight of a compound of formula (403), the sum of the amounts of compounds of formulae (401), (402) and (403) being 100%, is applied as component (B) in the dye mixtures according to the invention.

The azo dyes and dye mixtures according to the invention can be used in the dyeing and printing of semi-synthetic and, especially, synthetic hydrophobic fibre materials, more especially textile materials. Textile materials composed of blends that contain such semi-synthetic and/or synthetic hydrophobic textile materials can likewise be dyed or printed using the azo dyes or dye mixtures according to the invention.

Semi-synthetic textile materials that come into consideration are especially cellulose secondary acetate and cellulose triacetate.

Synthetic hydrophobic textile materials consist especially of linear, aromatic polyesters, for example those of terephthalic acid and glycols, especially ethylene glycol, or condensation products of terephthalic acid and 1,4-bis(hydroxymethyl)cyclohexane; of polycarbonates, e.g. those of α,α-dimethyl-4,4-dihydroxy-diphenylmethane and phosgene, and of fibres based on polyvinyl chloride and on polyamide.

The application of the azo dyes and dye mixtures according to the invention to the textile materials is effected in accordance with known dyeing procedures. For example, polyester fibre materials are dyed in the exhaust process from an aqueous dispersion in the presence of customary anionic or non-ionic dispersants and optionally customary swelling agents (carriers) at temperatures of from 80 to 140° C. Cellulose secondary acetate is dyed preferably at about from 65 to 85° C. and cellulose triacetate at temperatures of up to 115° C.

The azo dyes and dye mixtures according to the invention will not colour wool and cotton present at the same time in the dyebath or will colour such materials only slightly (very good reservation), so that they can also be used satisfactorily in the dyeing of polyester/wool and polyester/cellulosic fibre blend fabrics.

The azo dyes and dye mixtures according to the invention are suitable for dyeing in accordance with the thermosol process, in the exhaust and continuous process and for printing processes. The exhaust process is preferred. The liquor ratio is dependent upon the nature of the apparatus, the substrate and the form of make-up. It may, however, be selected within a wide range, e.g. from 1:4 to 1:100, but is preferably from 1:6 to 1:25.

The said textile material can be in a variety of processing forms, e.g. in the form of fibres, yarns or non-wovens, in the form of woven fabrics or knitted fabrics.

It is advantageous to convert the azo dyes and dye mixtures according to the invention into a dye preparation prior to use. For this purpose, the azo dyes are ground so that their particle size is on average from 0.1 to 10 microns. The grinding can be carried out in the presence of dispersants. For example, the dried azo dye is ground with a dispersant or is kneaded in paste form with a dispersant and then dried in vacuo or by atomisation. The preparations so obtained can be used, after the addition of water, to prepare printing pastes and dyebaths.

For printing, the customary thickeners will be used, e.g. modified or unmodified natural products, for example alginates, British gum, gum arabic, crystal gum, locust bean flour, tragacanth, carboxymethylcellulose, hydroxyethylcellulose, starch or synthetic products, for example polyacrylamides, polyacrylic acid or copolymers thereof, or polyvinyl alcohols.

The azo dyes and dye mixtures according to the invention impart to the mentioned materials, especially to polyester material, level colour shades having very good in-use fastness properties, such as, especially, good fastness to light, more especially very good high temperature light fastness, fastness to thermofixing, to pleating, to chlorine and to wetting, such as fastness to water, perspiration and washing; the finished dyeings are also distinguished by good fastness to rubbing.

The azo dyes and dye mixtures according to the invention can also be used satisfactorily in the preparation of mixed shades together with other dyes.

Furthermore, the azo dyes and dye mixtures according to the invention can be used as a suitable component in a trichromatic dyeing or printing technique.

The azo dyes and dye mixtures according to the invention are also very suitable for dyeing hydrophobic textile material from supercritical $CO_2$.

The present invention relates also to the above-mentioned use of the azo dyes and dye mixtures according to the invention as well as to a process for the dyeing or printing of semi-synthetic or synthetic hydrophobic fibre material, especially textile material, which process comprises applying the azo dyes or dye mixtures according to the invention to the said material or incorporating them into that material. The said hydrophobic fibre material is preferably textile polyester material. Further substrates that can be treated by the process according to the invention and also preferred process conditions can be found above in the detailed description of the use of the azo dyes and dye mixtures according to the invention. The invention relates also to hydrophobic fibre material, especially polyester textile material, dyed or printed by the said process.

The azo dyes and dye mixtures according to the invention are also suitable for modern reproduction processes, e.g. thermotransfer printing.

The following Examples serve to illustrate the invention. Unless otherwise indicated, parts are parts by weight and percentages are percentages by weight. The temperatures are given in degrees Celsius. The relationship between parts by weight and parts by volume is the same as that between grams and cubic centimetres.

I. SYNTHESIS EXAMPLES

I.1 Preparation of 1-hydroxy-5-amino-6,8-dichloroanthraquinone 28.7 g 1-hydroxy-5-aminoanthraquinone are dissolved in 128.5 g N-methylpyrrolidone (NMP). Chlorine gas is passed through the solution for three hours at a temperature of 0-5° C. The reaction mixture is stirred over night at room temperature. Afterwards the resulting solution is filtered off and the filter cake is recrystallized in NMP.

$^1$H NMR (250 MHz, CDCl$_3$) δ=12.32 (s, 1H), 7.97 (s, 1H), 7.80 (t, 1H), 7.71 (dd, 1H), 7.35 (dd, 1H)

I.2 Preparation of 1-hydroxy-5,7-dichloro-8-aminoanthraquinone 28.7 g 1-hydroxy-8-aminoanthraquinone are dissolved in 177 g NMP. Chlorine gas is passed through the solution for three hours at a temperature of 0-5° C. The reaction mixture is stirred over night at room temperature. Afterwards the resulting solution is filtered off and the filter cake is recrystallized in NMP.

$^1$H NMR (250 MHz, CDCl$_3$) δ=12.42 (s, 1H), 7.89 (s, 1H), 7.56 (t, 1H), 7.56 (dd, 1H), 7.30 (dd, 1H)

I.3 Preparation of 1,4-dihydroxy-5-nitro-8-aminoanthraquinone 5.0 g of boric acid is dissolved in 150 g of sulfuric acid. Subsequently, 1,4-dihydroxy-5-aminoanthraquinone is added at room temperature. Thereafter, 13.0 g of nitration acid (52% nitric acid in sulfuric acid) and, afterwards, 50 g of sulfuric acid is added dropwise at a temperature of 6-10° C. After 8 d stirring at room temperature the reaction mixture is given to 500 g of ice, 200 g of water and 10 g of sulfamic acid. The resulting suspension is filtered off and washed with acetic acid and water.

$^1$H NMR (250 MHz, CDCl$_3$) δ=12.83 (s, 1H), 8.60 (d, 1H), 7.68 (d, 1H), 7.36 (d, 1H), 7.31 (d, 1H)

Example I.4

Compound of Formula (101)

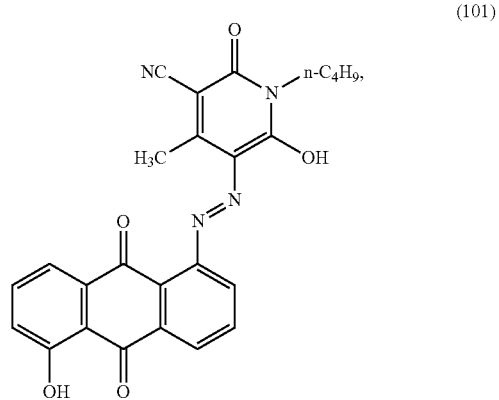

(101)

$λ_{max} = 472$ nm 2.4 g 5-amino-1-hydroxy anthraquinone are reacted with 3.2 g nitrosyl sulfuric acid (40%) in 18 g concentrated sulfuric acid at a temperature from 18 to 20° C. The diazotation is finished after 18 h. The resulting solution is dropped into a solution of 2.1 g 1-butyl-3-cyano-6-hydroxy-2-pyridone in 4 g of 10% aqueous NaOH which is cooled with an ice bath to keep the temperature at 10-20° C. The pH value is held between 1 and 2 by adding 37 g of 30% aqueous NaOH. After the reaction is completed, the mixture is filtered off. The residue is washed with an ethanol/water mixture and dried in vacuum.

$^1$H NMR (250 MHz, CDCl$_3$) δ=16.4 (s, 1H), 12.50 (s, 1H), 8.40 (dd, 1H), 8.28 (dd, 1H), 8.02 (dd, 1H), 7.90 (t, 1H), 7.74 (t, 1H), 7.36 (dd, 1H), 4.09 (t, 2H), 2.68 (s, 3H), 1.67 (m, 2H), 1.44 (m, 1H) 0.98 (t, 3H).

Examples I.2-I.93

In general accordance with the procedure described in Example 1.1, the following dyes can be prepared, which dye PES with good allround fastness properties.

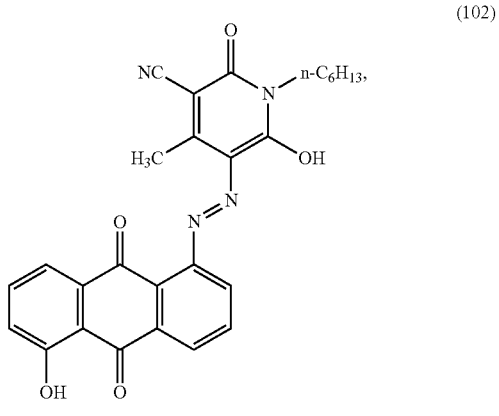

(102)

$λ_{max} = 473$ nm

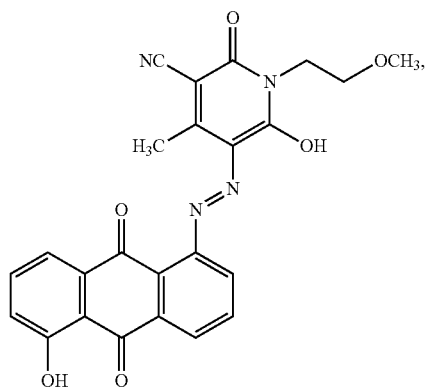
(103)
λ_max = 471 nm
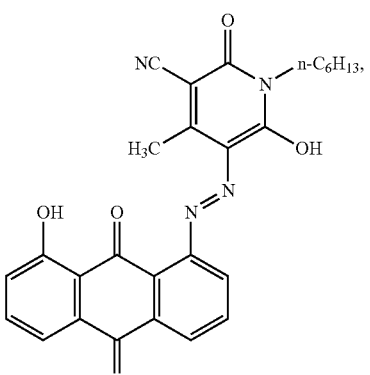
(106)
λ_max = 477 nm
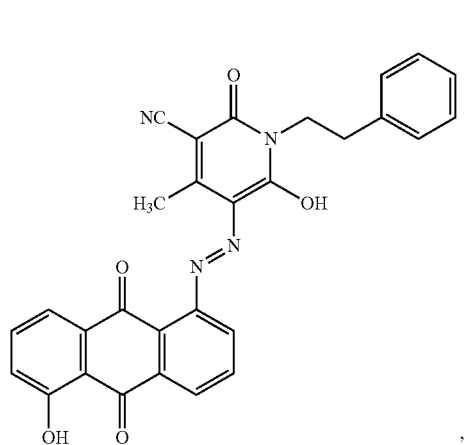
(104)
λ_max = 474 nm
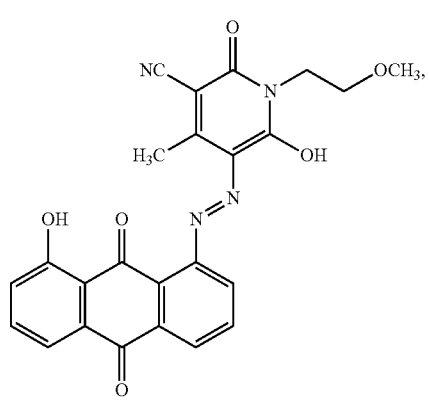
(107)
λ_max = 473 nm
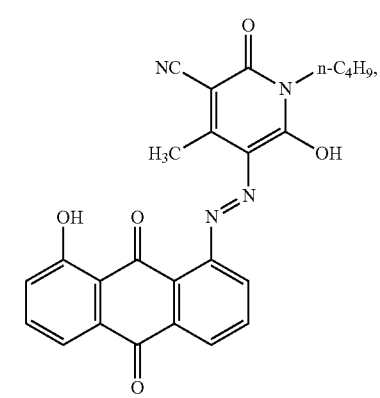
(105)
λ_max = 476 nm
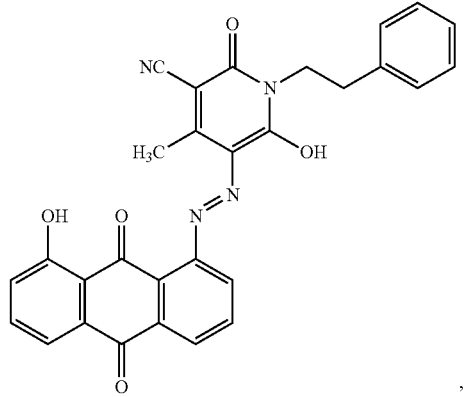
(108)
λ_max = 475 nm

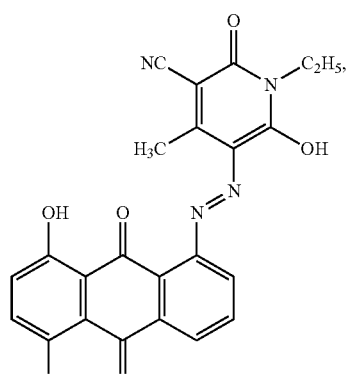
(109)
λ$_{max}$ = 506 nm
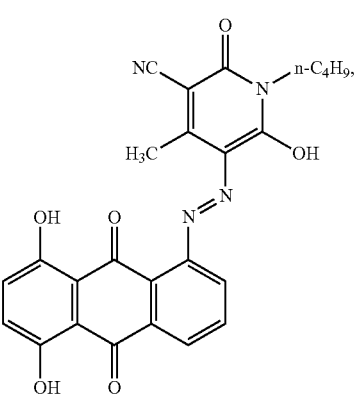
(110)
λ$_{max}$ = 506 nm
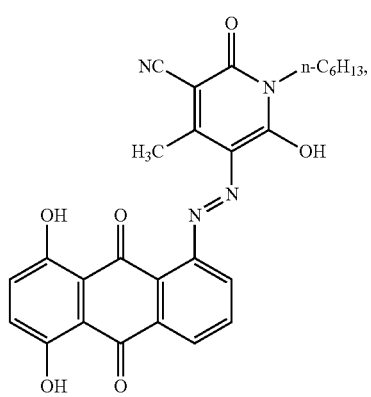
(111)
λ$_{max}$ = 507 nm
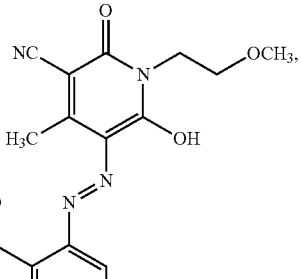
(112)
λ$_{max}$ = 503 nm
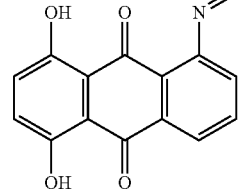
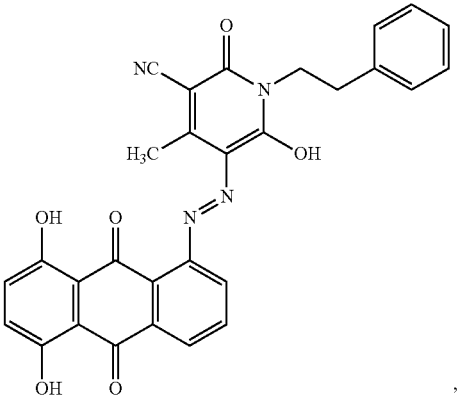
(113)
λ$_{max}$ = 503 nm
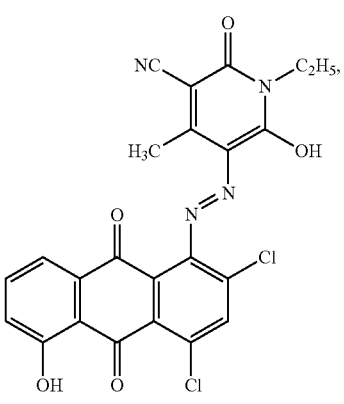
(114)
λ$_{max1}$ = 404 nm
λ$_{max2}$ = 456 nm -continued
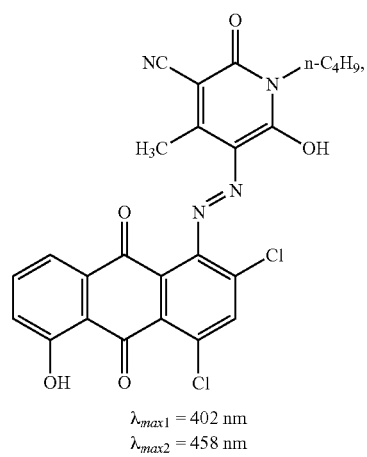
(115)
λ_max1 = 402 nm
λ_max2 = 458 nm
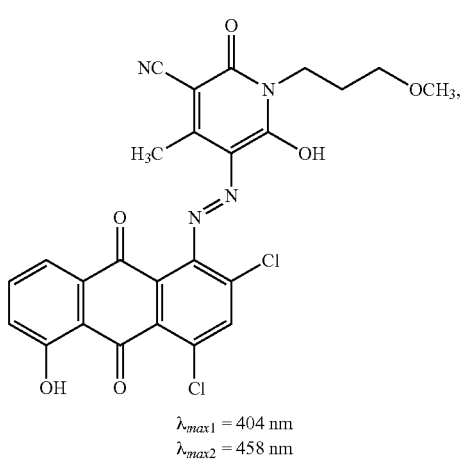
(116)
λ_max1 = 404 nm
λ_max2 = 458 nm
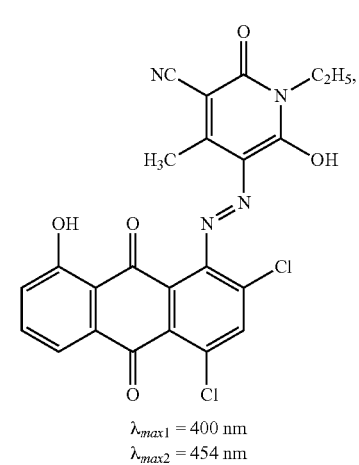
(117)
λ_max1 = 400 nm
λ_max2 = 454 nm
-continued
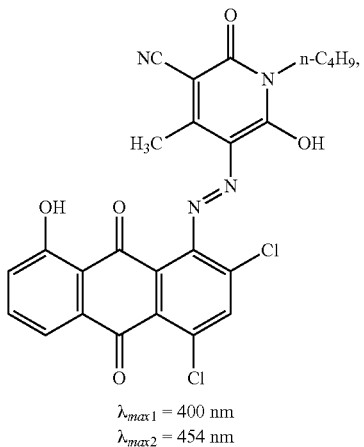
(118)
λ_max1 = 400 nm
λ_max2 = 454 nm
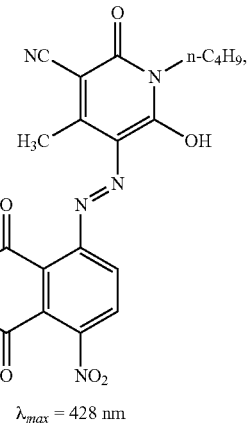
(119)
λ_max = 428 nm
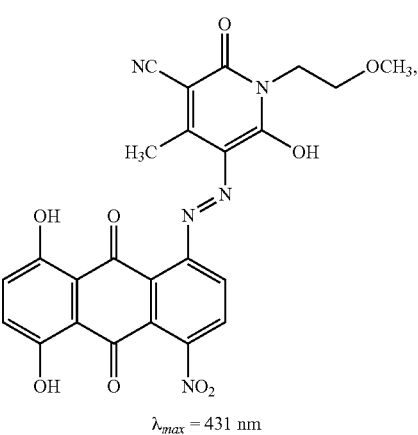
(120)
λ_max = 431 nm

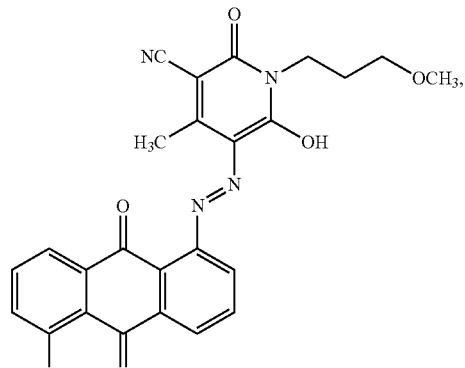
(121)
λ_max = 572 nm
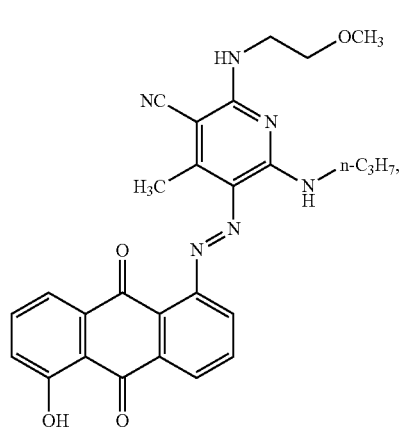
(201a)
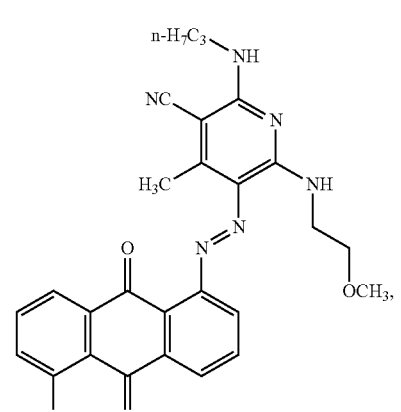
(201b)
λ_max = 451 nm
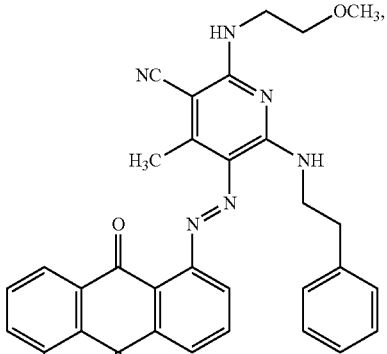
(202a)
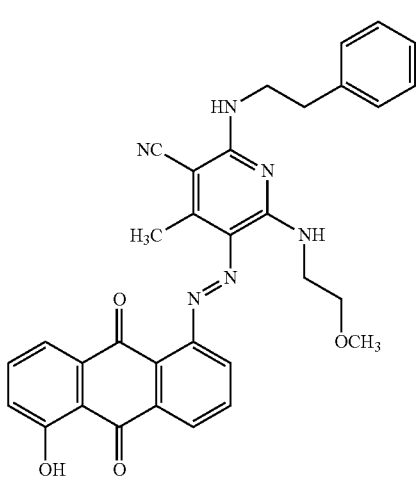
(202b)
λ_max = 456 nm
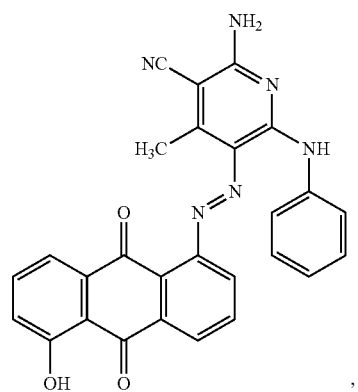
(203a)

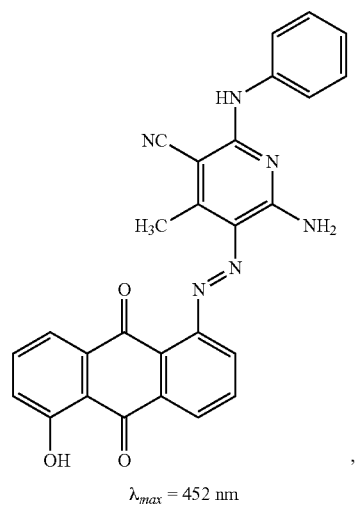
(203b)
λ_max = 452 nm
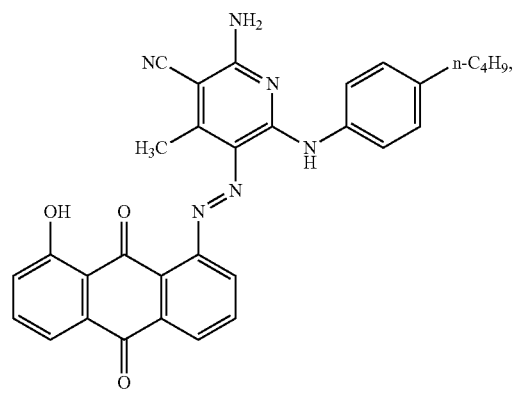
(205a)
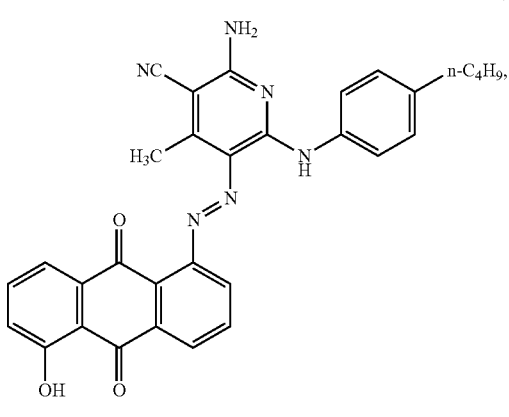
(204a)
(205b)
λ_max = 435 nm
(204b)
λ_max = 448 nm
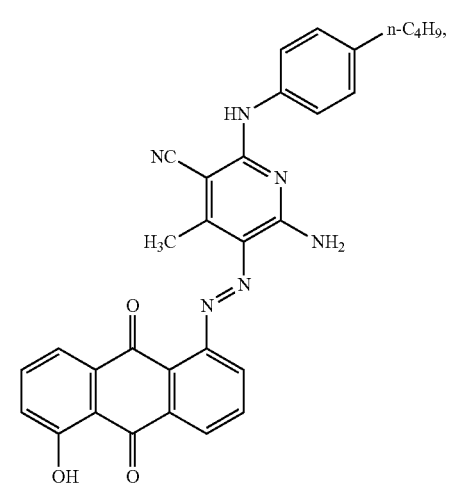
(206a)

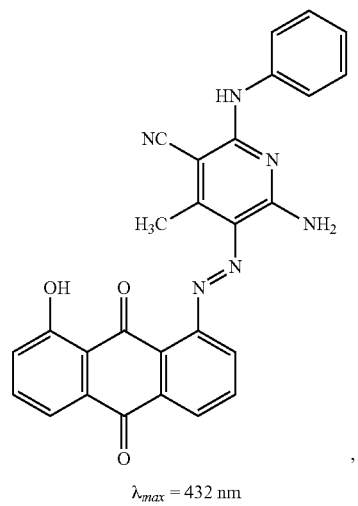
(206b)
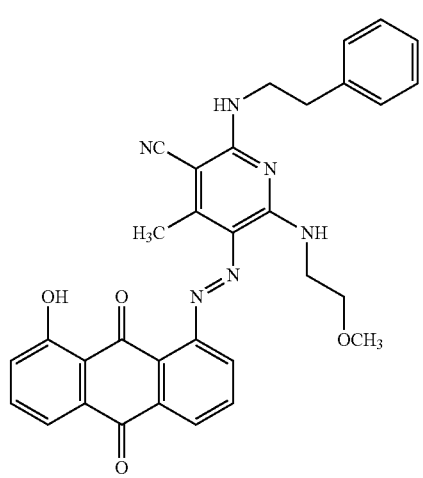
(208a)
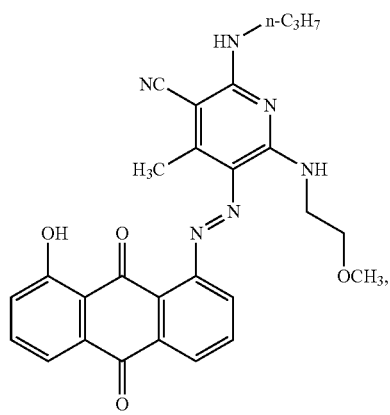
(207a)
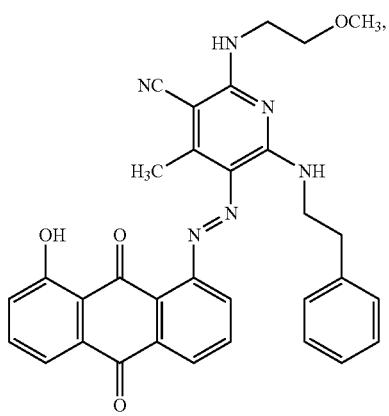
(208b)
λ_max = 438 nm
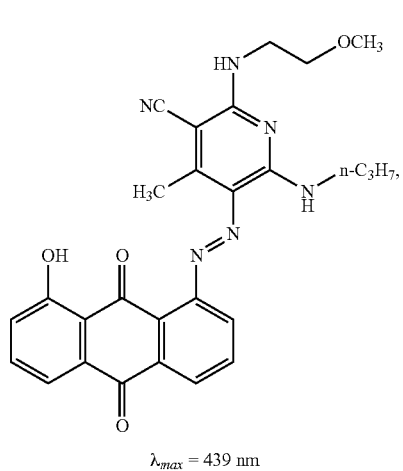
(207b)
λ_max = 439 nm
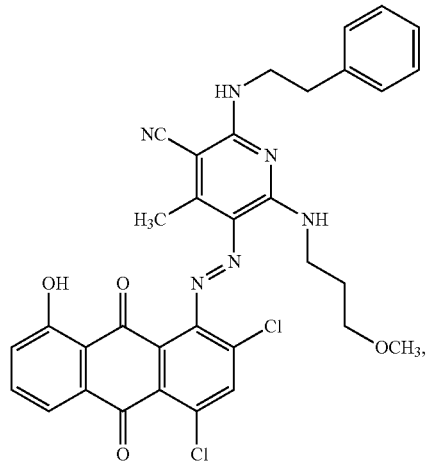
(209a)

-continued
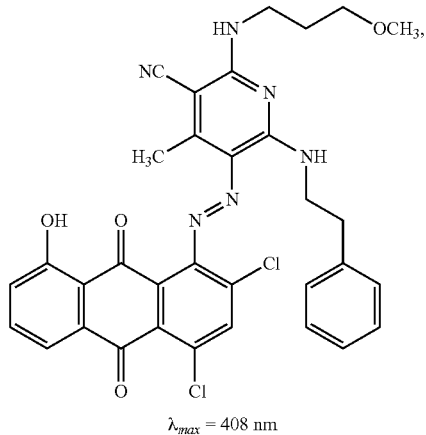
(209b)
λ_max = 408 nm
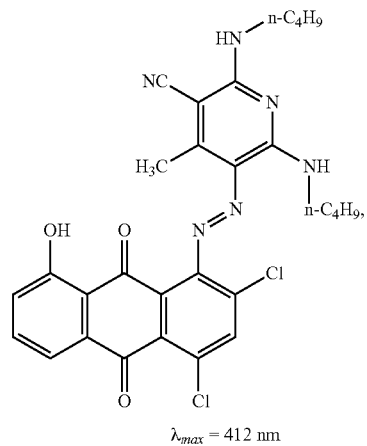
(211)
λ_max = 412 nm
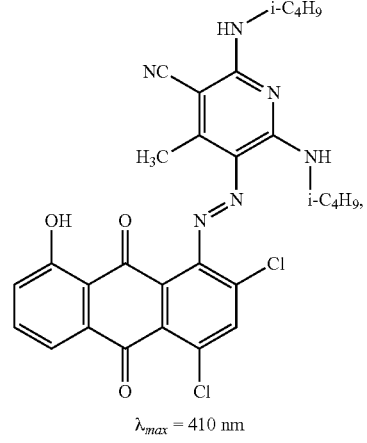
(212)
λ_max = 410 nm
-continued
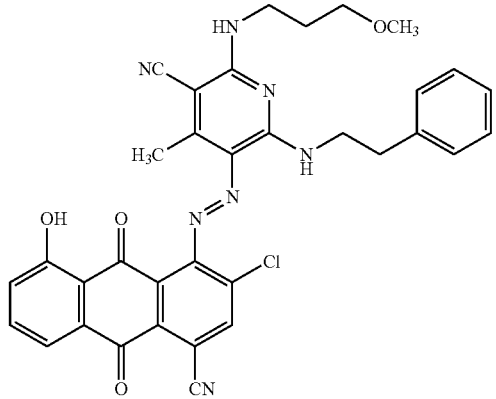
(213a)
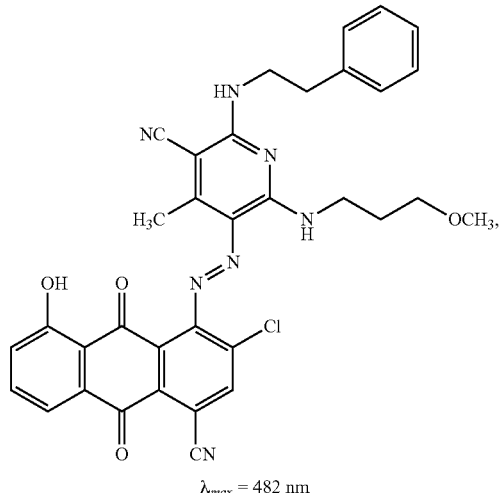
(213b)
λ_max = 482 nm
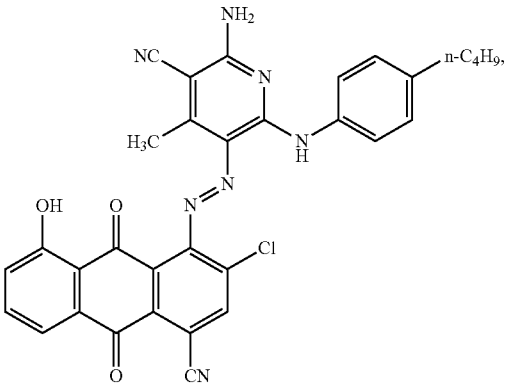
(214a)

-continued
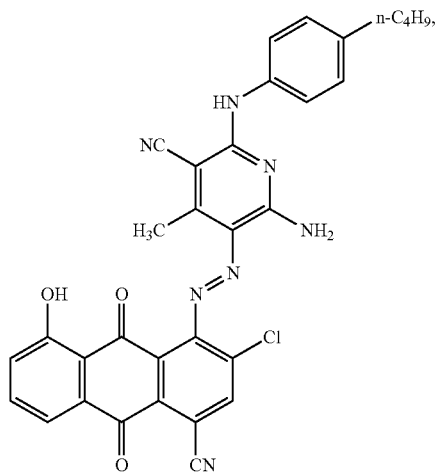
(214b)
λ_max1 = 468 nm
λ_max2 = 478 nm
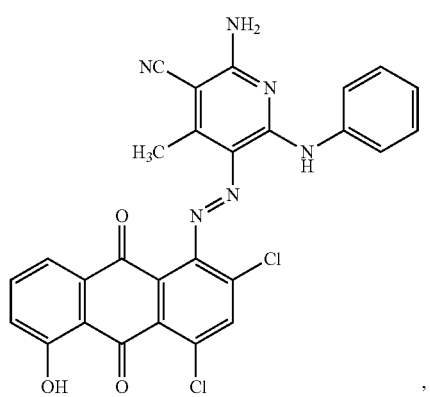
(215a)
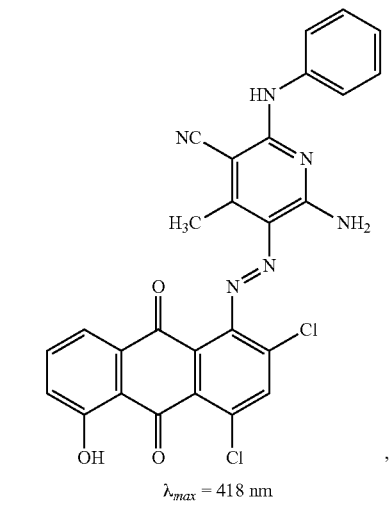
(215b)
λ_max = 418 nm
-continued
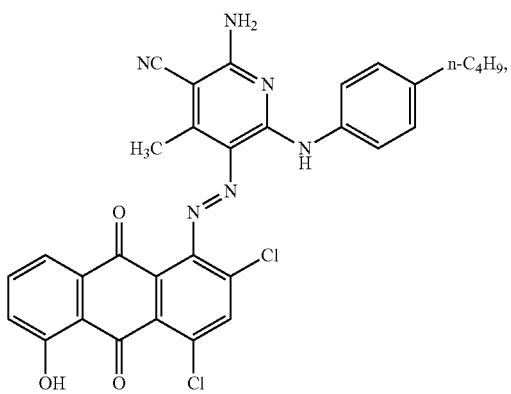
(216a)
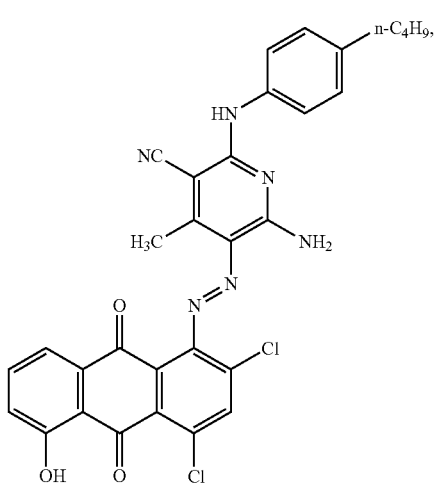
(216b)
λ_max = 420 nm
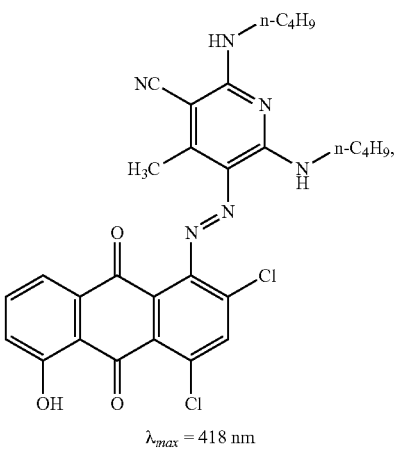
(217)
λ_max = 418 nm -continued
(218)
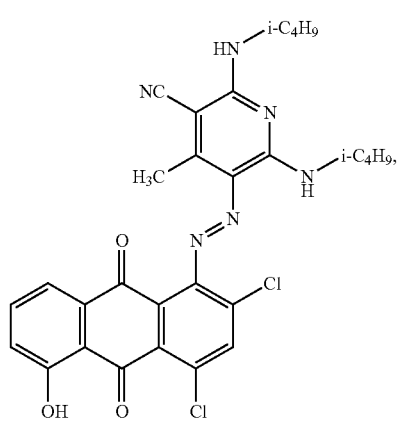
$\lambda_{max}$ = 416 nm
(219a)
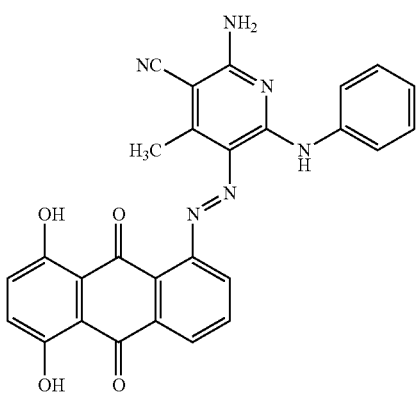
(219b)
$\lambda_{max1}$ = 452 nm
$\lambda_{max2}$ = 510 nm
-continued
(220a)
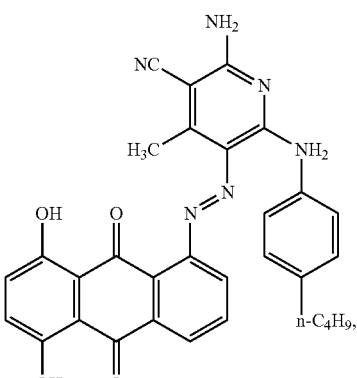
(220b)
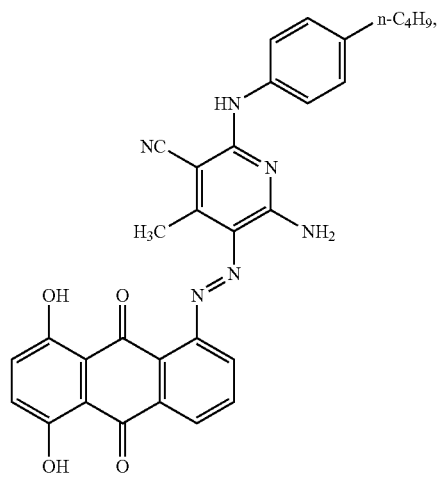
$\lambda_{max}$ = 452 nm
(221a)
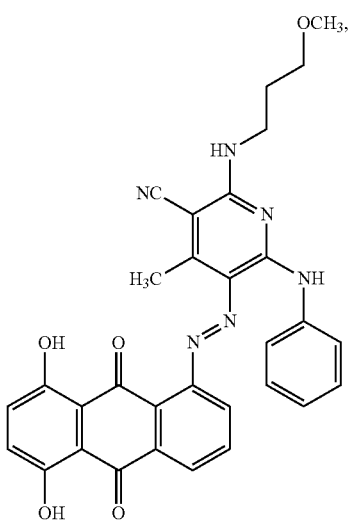

-continued
(221b)
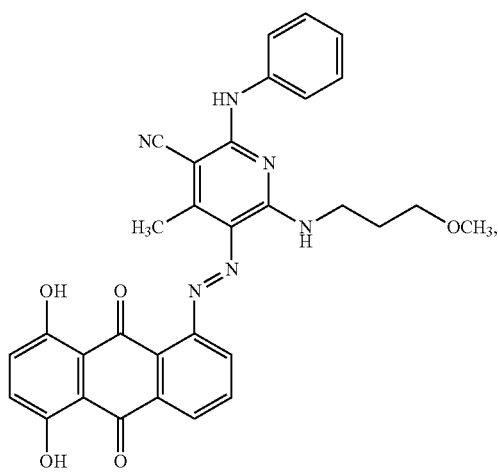
λ_max = 454 nm
(222a)
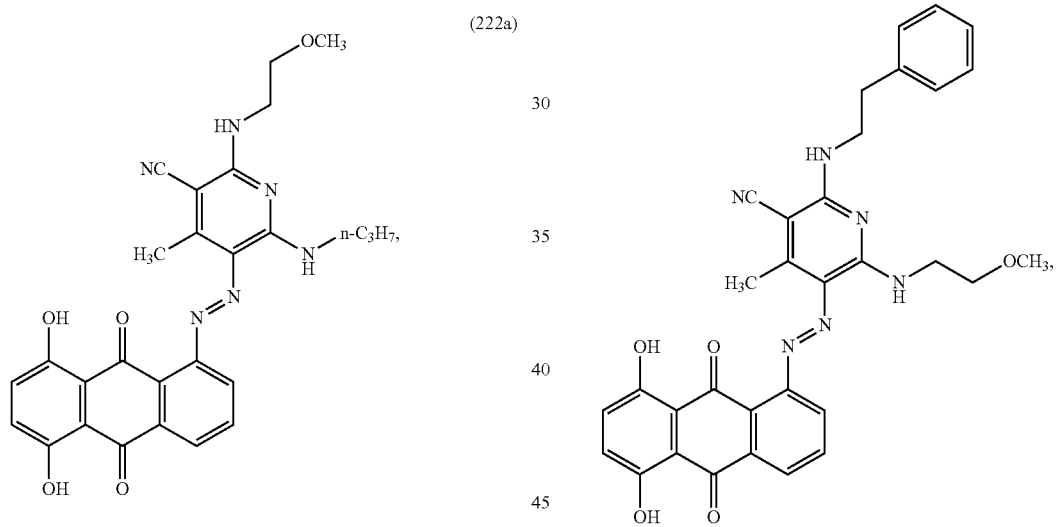
λ_max = 455 nm
-continued
(223a)
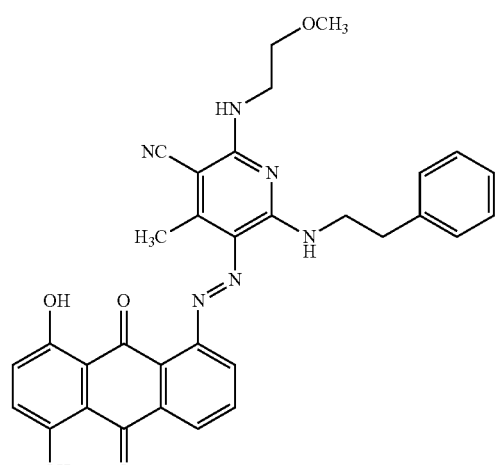
(223b)
λ_max = 456 nm
(224a)
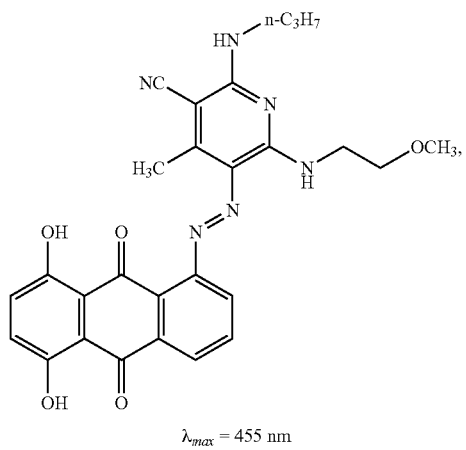

-continued
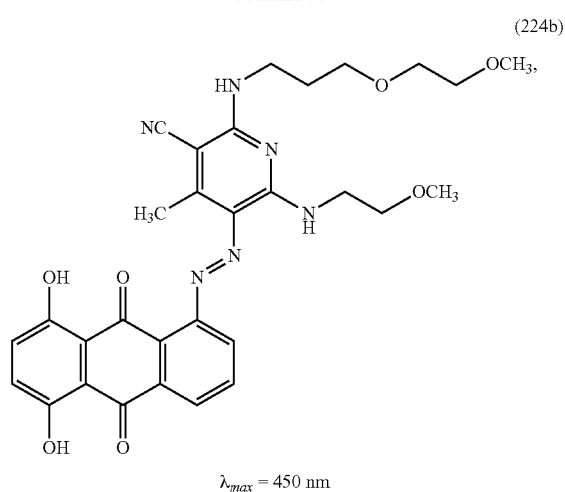
(224b)
λ_max = 450 nm
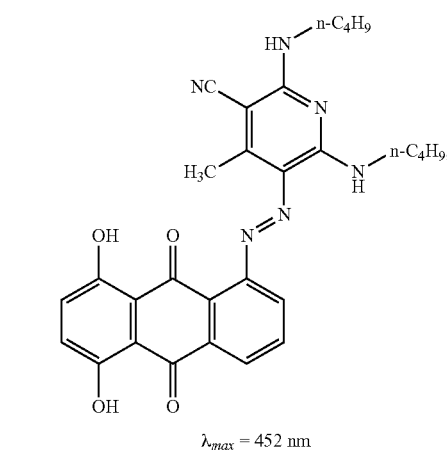
(225)
λ_max = 452 nm
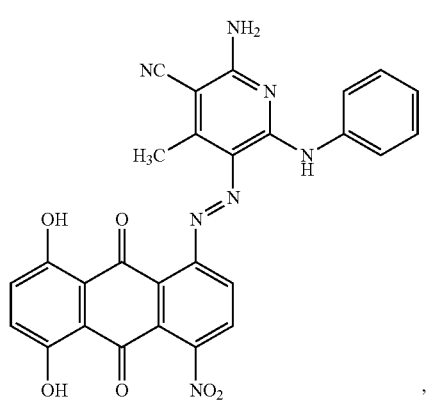
(226a)
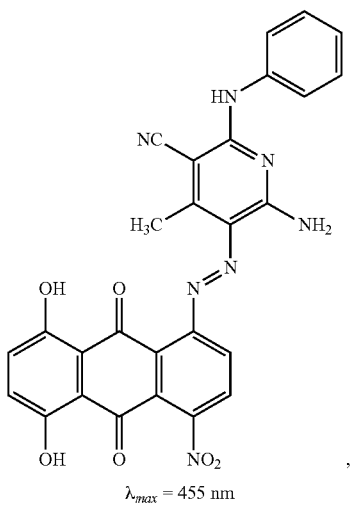
(226b)
λ_max = 455 nm
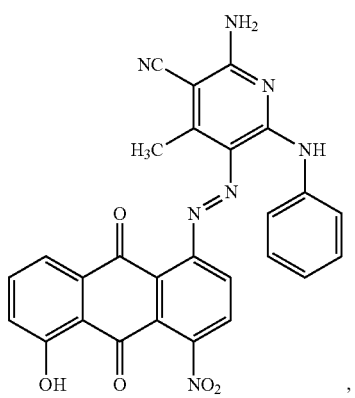
(227a)
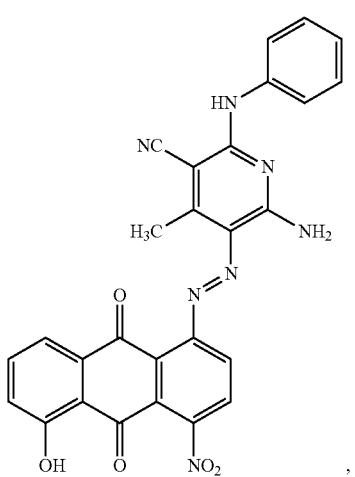
(227b)
λ_max = 436 nm
II. APPLICATION EXAMPLES
II.1 Exhaust Dyeing of Polyester
100 g of polyester fabric is immersed at room temperature, at a liquor ratio of 1:20, in a liquor containing
0.5 g of the azo dye of formula (101),
1 g/l of ammonium sulfate and
0.5 g/l of a commercial levelling agent, the liquor having been adjusted to a pH value of from 4.5 to 5 using 80% formic acid. The liquor is then heated first at a heating rate of 3° C./minute to 60° C. and then at a heating rate of 2° C./minute to 135° C.

At 135° C., dyeing is carried out for 60 minutes. The liquor is then cooled to 40° C., and the dyed polyester fabric is washed with water and cleaned reductively at from 70 to 80° C., for 20 minutes, in a bath containing 5 ml/l of 30% sodium hydroxide solution, 2 g/l of 85% sodium dithionite solution and 1 g/l of a commercial detergent. The finished dyeing is then washed with water and dried.

A tinctorially strong orange (?) dyeing having good allround fastness properties, especially high-temperature light fastness properties that are excellent, is obtained.

What is claimed is:

1. An azo dye of the formula

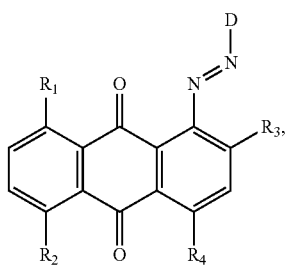

(1)

wherein $R_1$ is hydrogen, $R_2$ is hydroxy, $R_3$ is hydrogen, $R_4$ is hydrogen, and D represents a radical of the formula

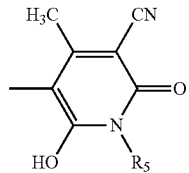

(2)

wherein $R_5$ denotes $C_4H_9$.

2. A process for the dyeing or printing of polyester material, wherein an azo dye of formula (1) according to claim 1 is applied to the polyester material or is incorporated into the polyester material.

3. A polyester material dyed or printed by the process according to claim 2.

* * * * *